(12) United States Patent
Teraoka (10) Patent No.: US 7,156,771 B2
(45) Date of Patent: Jan. 2, 2007

(54) CLUTCH UNIT

(75) Inventor: Masao Teraoka, Tochigi (JP)

(73) Assignee: Tochigi Fuji Sangyo Kabushiki Kaisha, Tochigi-Ken, jpx ( * ) Notice: Subject to any disclaimer, the term of this patent is extended or adjusted under 35 U.S.C. 154(b) by 98 days.

(21) Appl. No.: 10/918,052

(22) Filed: Aug. 13, 2004

(65) Prior Publication Data

US 2005/0040002 A1 Feb. 24, 2005

(30) Foreign Application Priority Data

Aug. 19, 2003 (JP) .................. P. 2003-295022

(51) Int. Cl.
| | |
|---|---|
| B60K 1/00 | (2006.01) |
| B60K 6/02 | (2006.01) |
| B60K 17/16 | (2006.01) |
| B60K 17/356 | (2006.01) |
| F16D 28/00 | (2006.01) |

(52) U.S. Cl. .................. 477/5; 192/53.34; 192/84.6; 192/103 R; 192/108; 477/181

(58) Field of Classification Search ............. 192/53.34; 477/8, 14, 181
See application file for complete search history.

(56) References Cited

U.S. PATENT DOCUMENTS

| | | | | |
|---|---|---|---|---|
| 2,397,620 A | * | 4/1946 | Orr ........................ | 192/53.34 |
| 3,270,843 A | * | 9/1966 | Ivanchich ............... | 192/53.341 |
| 3,830,349 A | * | 8/1974 | Williams ................. | 192/103 F |
| 3,915,271 A | * | 10/1975 | Harper ................... | 477/5 |
| 5,503,603 A | * | 4/1996 | Adam et al. ............. | 475/204 |
| 5,975,263 A | * | 11/1999 | Forsyth ................... | 192/53.34 |
| 6,027,422 A | | 2/2000 | Kaisha | |
| 6,175,785 B1 | * | 1/2001 | Fujisawa et al. ........ | 192/103 R |
| 2002/0019284 A1 | * | 2/2002 | Aikawa et al. ........... | 475/5 |
| 2002/0153220 A1 | * | 10/2002 | Dick ....................... | 192/108 |
| 2004/0163916 A1 | * | 8/2004 | Showalter ................ | 192/48.2 |

FOREIGN PATENT DOCUMENTS

| | | |
|---|---|---|
| DE | 196 11 183 A1 | 9/1997 |
| DE | 101 51 713 A1 | 7/2002 |
| FR | 2 444 845 | 7/1980 |
| JP | 2003-104073 | 4/2003 |

OTHER PUBLICATIONS

English translation of German Appl. No. 10 2004 039 826.7-12 mailed on Dec. 1, 2005, 2 pages.
German Office Action for German Appl. No. 10 2004 039 826.7-12 mailed on May 31, 2006, 3 pages.
German Office Action for German Appl. No. 10 2004 039 826.7-12 mailed on Dec. 1, 2005, 3 pages.

* cited by examiner

*Primary Examiner*—Rodney H. Bonck
(74) *Attorney, Agent, or Firm*—Osha Liang LLP (57) ABSTRACT

In a clutch unit, an engagement of a dog clutch can be restricted until a revolution of an input shaft and the revolution of an output shaft correspond to each other so as to be suitable for the engagement. The engagement can be effected when the revolution of the input shaft and the revolution of the output shaft have corresponded so as to be suitable for the engagement. Accordingly, the revolution of the input shaft and the revolution of the output shaft are speedily synchronized, and engagement shocks of the dog clutch can be accurately suppressed. Hence, it is possible to reliably transmit the torque to be transmitted from the driving source to the wheel side through the reduction mechanism.

16 Claims, 5 Drawing Sheets

CLUTCH UNIT

BACKGROUND OF THE INVENTION

The present invention relates to a clutch unit used in a reduction-drive device, and a vehicle having the clutch unit.

An electromagnetic clutch using a multiplicity of friction plates is known as a conventional clutch unit for a differential-drive device. The differential-drive device has a reduction mechanism and a differential (differential device). The electromagnetic clutch is provided between the reduction mechanism and the differential in the differential-drive device, and changeovers a torque transmission and torque cutoff between the reduction mechanism and the differential.

Accordingly, if the electromagnetic clutch is in a torque transmitting state, as the driving source is driven for generating driving torque, the torque which has been decelerate through the reduction mechanism is transmitted to the differential through the electromagnetic clutch. The torque is transmitted from the differential to the left and right axle shafts.

When the driving source is stopped, the electromagnetic clutch is changed over to a torque cutoff state. In this state of changeover, even if the wheel-side rotation is transmitted to the differential, the rotation is not transmitted to the reduction mechanism and the driving source. For this reason, when the output of the driving source is stopped, the reduction mechanism and the driving source are prevented from being forcibly driven by the wheel-side rotation.

However, in the case of a configuration in which a changeover of transmission and cutoff of torque is effected by the electromagnetic clutch, there is a problem in that the torque transmitting capacity is small. If an attempt is made to enlarge the torque transmitting capacity of the electromagnetic clutch, the electromagnetic clutch becomes large in size, and there are problems in that the weight becomes large, and that the cost becomes high.

In addition, in the case of the electromagnetic clutch using a multiplicity of friction plates, even if the electromagnetic clutch is set in a cutoff state, there is a possibility of the occurrence of a large drag torque due to the viscosity of oil and the like. The larger the electromagnetic clutch, the more this drag torque increases, so that an increase in the torque transmitting capacity of the electromagnetic clutch is limited.

Therefore, it is a object of the invention to provide a clutch unit in which a torque transmitting capacity is large, and any drag torque does not occur.

SUMMARY OF THE INVENTION

In order to achieve the object, a clutch unit of the present invention comprises an input shaft; an output shaft; a dog clutch engagable and disengagable to connect and disconnect the input shaft and the output shaft; a operation mechanism for operating the dog clutch; and a first moving mechanism for restricting a movement of the dog clutch in a direction in which the dog clutch becomes engaged, until a revolution of the input shaft and a revolution of the output shaft becomes suitable for an engagement of the dog clutch.

In the clutch unit, the first moving mechanism may comprise an idle rotator having a ring-like shape and provided on one of the input shaft and the output shaft.

In the clutch unit, the idle rotator may be provided on the input shaft, and the first moving mechanism may further comprises conical surfaces provided between the idle rotator and the input shaft.

In the clutch unit, the idle rotator may be provided on the output shaft, and the first moving mechanism may further comprise conical surfaces provided between the idle rotator and the output shaft.

In the clutch unit, the dog clutch may include an input side teeth portion integrally rotatable with the input shaft; an output side teeth portion integrally rotatable with the output shaft; and a sleeve, having a sleeve side teeth portion meshable with the input side teeth portion and the output side teeth portion, the sleeve is movable between a position wherein the sleeve side teeth portion meshes with only one of the input side teeth portion and the output side teeth portion and a position wherein the the sleeve side teeth portion meshes with both the input side teeth portion and the output side teeth portion, and the idle rotator may include an idle teeth portion disposed between the input side teeth portion and the output side teeth portion and meshable with the sleeve teeth portion.

In the clutch unit, the operation mechanism may comprise a second moving mechanism for restricting the movement of the dog clutch in the direction in which the dog clutch becomes disengaged.

In the clutch unit, the second moving mechanism may comprise a cam structure for generating a thrust to move the dog clutch in a direction in which the dog clutch becomes engaged.

In the clutch unit, the operation mechanism may further comprise an actuator and a reduction rotor.

In the clutch unit, the operation mechanism may further comprise a spring disposed between the reduction rotor and the cam structure.

Further, the clutch unit may comprise a disengaging mechanism for generating a thrust to move the dog clutch in a direction in which the dog clutch becomes disengaged.

In the clutch unit, the disengaging mechanism may comprise abutment surfaces formed on respective teeth of the input side teeth portion and the sleeve side teeth portion, and the abutment surfaces have positive tapers wherein each tooth of the input side teeth portion has a thickness that continuously decreases toward the sleeve side, and each tooth of the sleeve side teeth portion has a thickness that continuously decreased toward the input shaft side.

Furthermore, the clutch unit may comprise a input shaft side sensor for detecting the revolution of the input shaft, and a output shaft side sensor for detecting the revolution of the output shaft.

In addition, the clutch unit may further comprise a controller that controls the operation mechanism to operate the dog clutch to engage when the revolution of the output shaft and the revolution of the input shaft are suitable for the engagement of the dog clutch, and controls a driving source to decrease a driving force so that the revolution of the input shaft decreases to approach the revolution of the output shaft when revolution of the input shaft exceeds the revolution of the output shaft, wherein the driving source provides the driving force to the input shaft.

Further, the clutch unit may be applied to a vehicle including a first and a second driving sources; and the input shaft of the clutch unit may be connected to the second driving source, and the output shaft of the clutch unit may be rotatable attributed by a driving force from the first driving source.

Further, one of the first and the second driving sources may be a main driving source, and the other may be an auxiliary driving source.

In addition, the main driving source may comprise an internal combustion engine, and the auxiliary driving source may comprise an electric motor, and one of the internal combustion engine and the electric motor drives one of front and rear wheels, and the other of the internal combustion engine and the electric motor drives the other of front and rear wheels.

In the clutch unit in accordance with the invention, the first moving mechanism is provided for restricting the engaging coupling of the dog clutch until the revolution of input shaft and the revolution of output shaft correspond to each other so as to be suitable for the engagement when the dog clutch has been actuated to transmit the output after the starting of the output of the driving source. Therefore, when the dog clutch is engaged and coupled at the time of synchronization of the output side and the input side by increasing the rotation of the driving source, the engaging coupling of the dog clutch can be restricted until the revolution of input shaft and the revolution of output shaft correspond to each other so as to be suitable for the engaging coupling. The engaging coupling can be effected when the revolution of input shaft and the revolution of output shaft have corresponded so as to be suitable for the engaging coupling. Accordingly, the revolution of input shaft and the revolution of output shaft are speedily synchronized, and engagement shocks of the dog clutch can be accurately suppressed. Hence, it is possible to reliably transmit the torque to be transmitted from the driving source to the wheel side through the reduction mechanism.

In addition, since the dog clutch is used, despite the fact that it is compact as compared with a multiple-disk friction clutch, it is possible to substantially improve the torque transmitting capacity.

When the dog clutch is disengaged from coupling and is set in the torque cutoff state, the occurrence of drag torque as in the case of the multiple-disk friction clutch is controlled, and it is possible to effect a positive cutoff. By virtue of this positive cutoff, improvement in fuel consumption is possible.

In addition, the operation mechanism is provided which is capable of actuating the dog clutch into a state of engagement and of restricting the movement of the dog clutch in the direction in which the dog clutch becomes disengaged. Therefore, in the engaged state of the dog clutch, the engaged state can be maintained positively.

Since the dog clutch is provided with an abutment surface for generating a moving force in the direction in which the dog clutch becomes disengaged by the transmission of the torque, when the dog clutch has been actuated to be shifted into the torque cutoff state by the clutch driving means, it is possible to actuate the dog clutch positively in the direction in which it is disengaged by the actuating force of the abutment surface.

Accordingly, it is possible to effect more accurately the positive maintenance of the engaged state of the dog clutch and the shifting operation to the torque cutoff state.

Since the operation mechanism is capable of restricting by the cam structure the movement of the dog clutch in the direction in which the dog clutch becomes disengaged, it is possible to positively maintain the engaged state of the dog clutch by the cam structure.

The dog clutch is constituted of the input side teeth portion provided integrally on the input shaft, the output side teeth portion provided integrally on the output shaft, and the sleeve which has the sleeve side teeth portion engageable with the input and the output side teeth portions and is capable of being actuated into the state of engaging with both the input and the output side teeth portions and into the state of engaging with only the output side teeth portion.

Further, the first moving mechanism is comprised of the idle rotator disposed between the input and the output teeth portions and having the idle teeth portion engageable with the sleeve side teeth portion, and the conical surface provided between the idle rotator and the input shaft. Therefore, when the sleeve is actuated into the state of engaging both the input and the output teeth portions, tooth end portions of the sleeve side teeth portion abut against tooth end portions of the idle teeth portion until the a revolution of the input shaft and a revolution of the output shaft correspond so as to be suitable for the engaging coupling, thereby restricting the movement of the sleeve. Thus, it is possible to restrict the engagement between the sleeve side teeth portion and the idle teeth portion.

As a result of this restriction of engagement, the sleeve presses the idle rotator, and it is possible to increase the frictionally engaging force between the idle rotator and the input side teeth portion by means of the conical surface. As a result of this increase in the frictionally engaging force, the tooth end portions of the sleeve side teeth portion receive torque based on the difference between the a revolution of the input shaft and a revolution of the output shaft from the tooth end portions of the idle engaging portion. By virtue of this torque, resistance force with respect to the sleeve in the direction of movement for engagement increases, and it is possible to positively restrict the motion of the sleeve into the state of engagement with both the input and output engaging portions.

When the a revolution of the input shaft and a revolution of the output shaft have corresponded so as to be suitable for engagement, the torque acting on the tooth end portions of the sleeve side teeth portion from the tooth end portions of the idle teeth portion becomes small or disappears. Therefore, the resistance force with respect to the sleeve in the direction of movement for engagement becomes small or disappears. For this reason, the sleeve can be moved smoothly, and the sleeve side teeth portion can be engaged with the idle teeth portion, thereby allowing the sleeve to be actuated into the state of engagement with both the input and the output side teeth portions.

Through such operation, it is possible to reliably suppress engagement shocks of the dog clutch.

The controller is provided for providing control such that the dog clutch is actuated when the revolution of input shaft has approached the revolution of the output shaft, an the rotation of the driving source is decreased until the a revolution of the input shaft and a revolution of the output shaft correspond to each other so as to be suitable for the engaging coupling when the dog clutch is not engaged and the revolution of the input shaft exceeds the revolution of the output shaft. Therefore, even in a case where the engaging coupling of the dog clutch is not effected even if the a revolution of the input shaft and a revolution of the output shaft have corresponded to each other so as to be suitable for the engaging coupling when, and the revolution of the driving source has tended to further increase, it is possible to allow the engaging coupling of the dog clutch by decreasing the revolution of the driving source again.

Accordingly, even in cases where the engaging coupling of the dog clutch has failed for some reason or other, the driving source does not undergo high rotation to no purpose, and it is possible to maintain the durability of the driving source.

Since the driving source is an auxiliary driving source with respect to a main driving source, the auxiliary driving source can be formed to be compact and lightweight.

The main driving source is an internal combustion engine, and the auxiliary driving source is an electric motor, one of the internal combustion engine and the electric motor being adapted to drive one of front and rear wheels and the other one of the internal combustion engine and the electric motor being adapted to drive the other one of the front and rear wheels. Therefore, in the four-wheel drive vehicle, the reduction-drive device for transmitting power to one of the front and rear wheels can be formed to be compact and lightweight.

DESCRIPTION OF THE PREFERRED EMBODIMENT

The object of suppressing engagement shocks is realized by providing restricting means for restricting the engaging coupling of the dog clutch until the a revolution of the input shaft and a revolution of the output shaft correspond to each other so as to be suitable for engagement.

Figure 1:
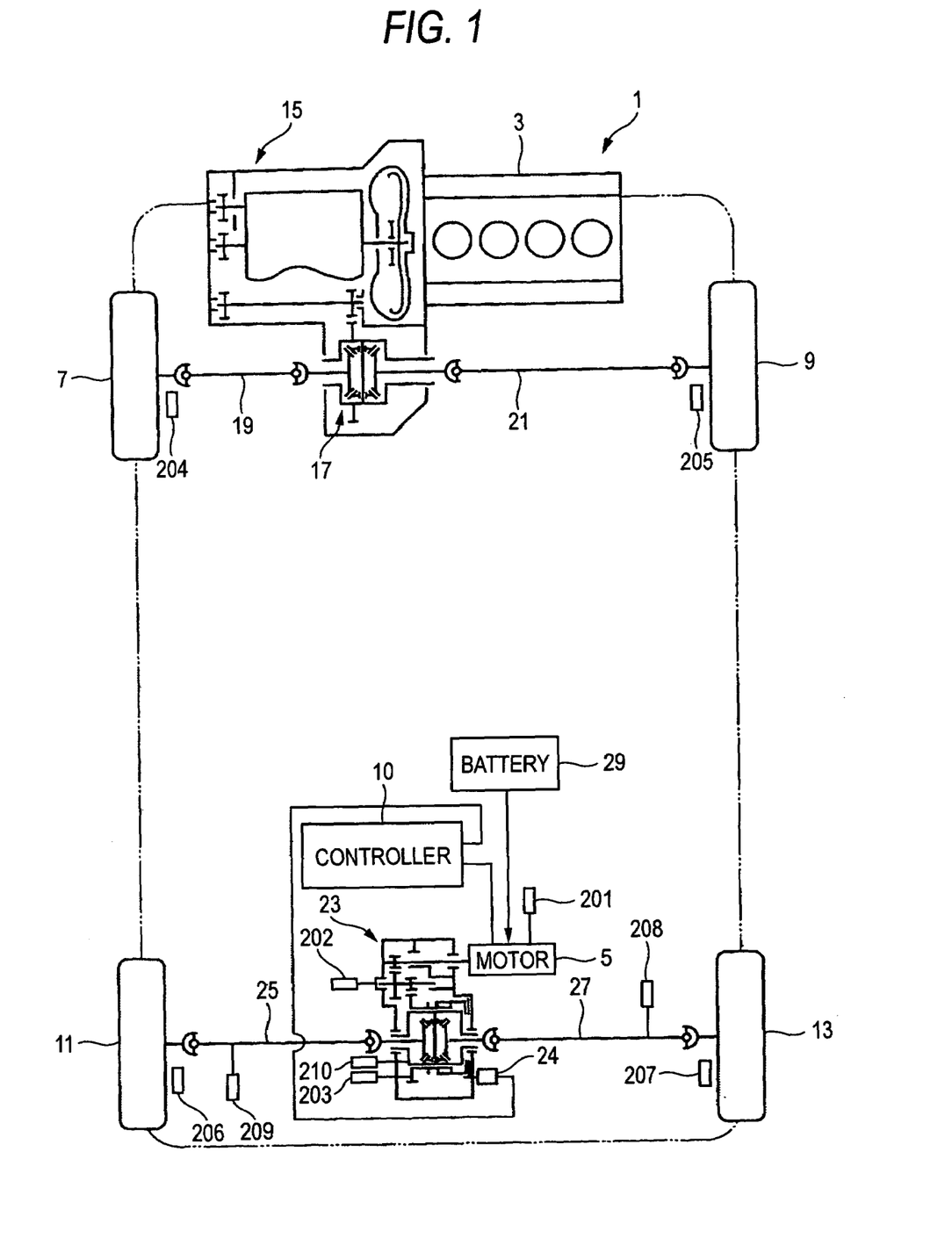
FIG. 1 is a skeleton plan view of a four-wheel drive vehicle to which a clutch unit of the invention is applied.

FIG. 1 is a skeleton plan view of a four-wheel drive vehicle to which a clutch unit of the invention is applied. As shown in FIG. 1, a four-wheel drive vehicle 1 has an engine 3 which is internal combustion engine serving as a main driving source and an electric motor 5 serving as an auxiliary driving source. The engine 3 in this embodiment is a driving source for driving left and right front wheels 7 an 9, while the electric motor 5 is a driving source for driving left and rear wheels 11 and 13 under control by a controller 10. However, a configuration may be provided such that the front wheels are driven by the electric motor 5 which is the auxiliary driving source, and the rear wheels 11 and 13 are driven by the engine 3 which is the main driving source.

An output of the engine 3 is adapted to be inputted to a front differential 17 through a transmission 15. The front wheels 7 and 9 are interlocked and coupled to the front differential 17 through left and right axle shafts 19 and 21.

An output of the electric motor 5 is adapted to be inputted to a clutch unit 200 provided in a reduction-drive device 23. The clutch unit 200 is provided with a changeover motor 24 of a clutch driving means (a operation mechanism) which will be described later. The changeover motor 24 acts as an actuator 24 of the clutch driving means (the operation mechanism) and comprises an electric motor 24. The electric motor 5 and the changeover motor 24 are adapted to be controlled by the aforementioned controller 10. Detected values of wheel speed sensors 204, 205, 206 and 207 for the front and rear wheels 7, 9, 11, and 13 are adapted to be inputted to the controller 10.

The left and right rear wheels 11 and 13 are interlocked and coupled to an output side of the reduction-drive device 23 through left and right axle shafts 25 and 27.

Electric power is supplied to the electric motor 5 from a battery 29 or directly from a generator which will be described later. During the deceleration and the like of the vehicle, the battery 29 is adapted to be charged by electric power generated by the generator.

Accordingly, during normal traveling, the torque is transmitted to the front differential 17 through the transmission 15 by the driving of the engine 3. The torque is transmitted from the front differential 17 to the left and right front wheels 7 and 9 through the left and right axle shafts 19 and 21.

In addition, power is supplied to the electric motor 5 under control by the controller 10, and the output of the electric motor 5 is transmitted to the reduction-drive device 23. At this time, the changeover motor 24 is driven under control by the controller 10, and a dog clutch which will be described later is changed over to a torque transmitting state so that the clutch unit 200 transmits the torque in the reduction-drive device 5. Thus the torque is transmitted from the reduction-drive device 23 to the left and right rear wheels 11 and 13 through the left and right axle shafts 25 and 27.

Accordingly, the four-wheel drive vehicle 1 is capable of traveling in a state of being four-wheel driven through the driving of the front wheels 7 and 9 by the engine 3 and the auxiliary driving of the rear wheels 11 and 13 by the electric motor 5.

Figure 2:
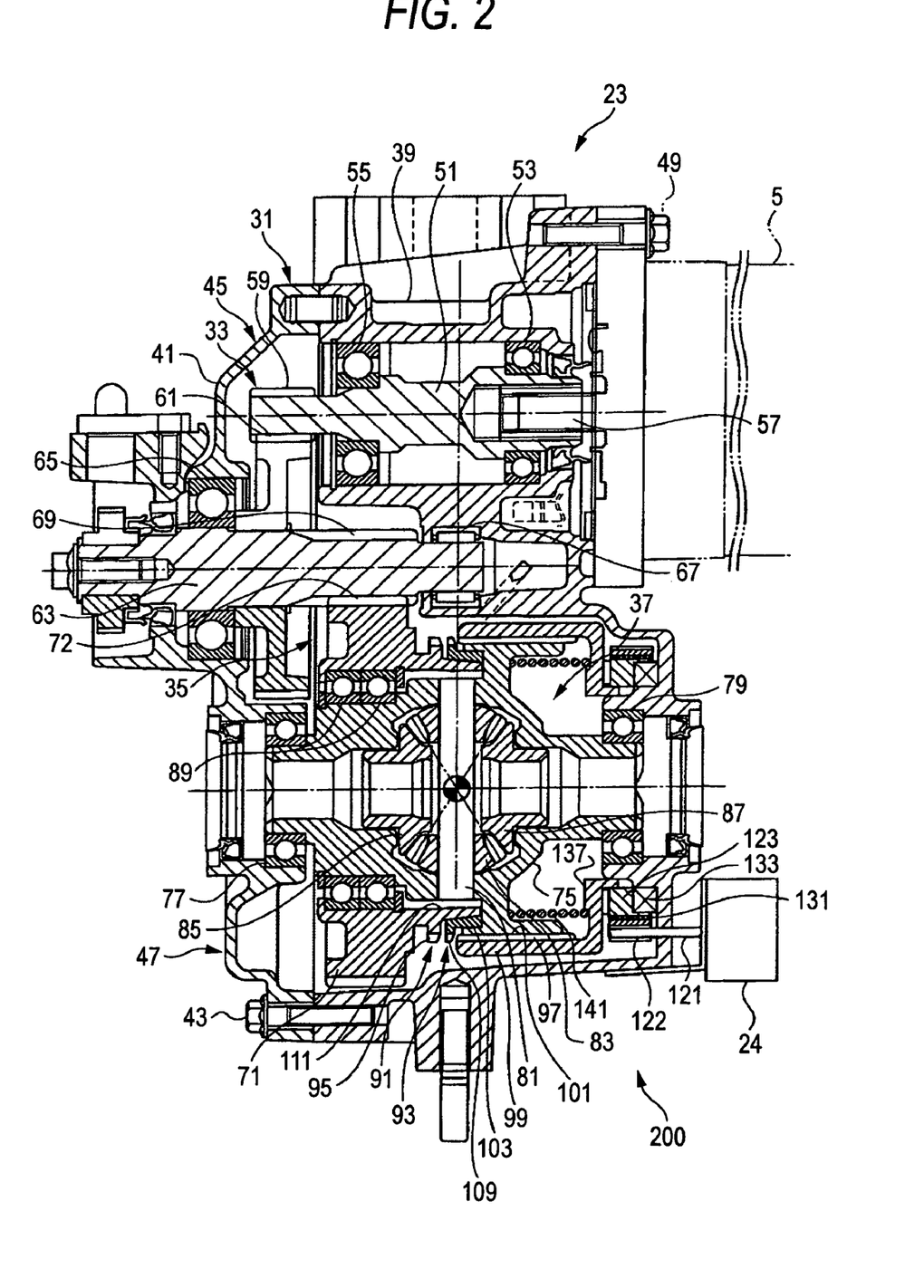
FIG. 2 is a cross-sectional view of a reduction-drive device to which the clutch unit in accordance with the embodiment is applied.
Figure 3:
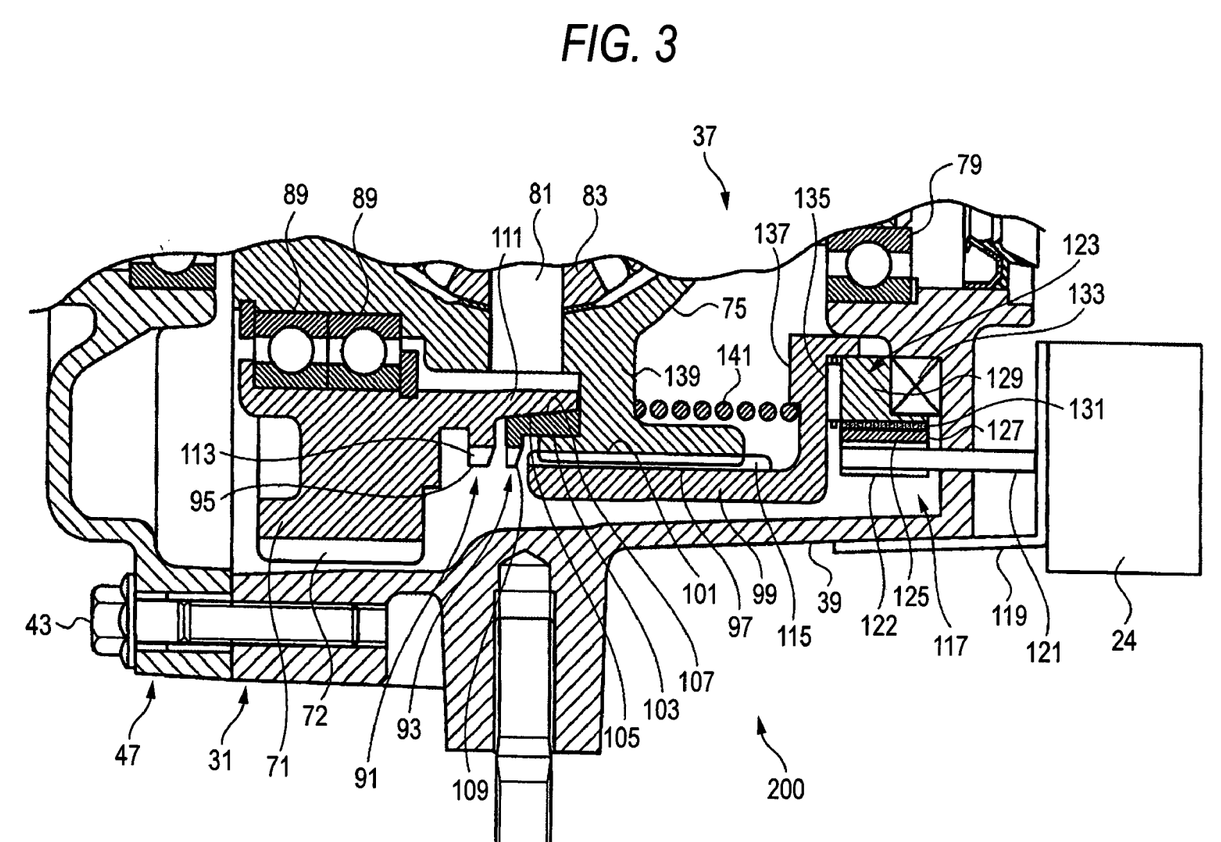
FIG. 3 is an enlarged cross-sectional view of essential portions of the clutch unit in accordance with the embodiment.

The reduction-drive device 23 of such a four-wheel drive vehicle 1 is configured as shown in FIGS. 2 and 3, for example. FIG. 2 is a cross-sectional view of the reduction-drive device 23 in which the clutch unit 200 of the invention is applied, and FIG. 3 is an enlarged cross-sectional view of essential portions of the clutch unit 200.

As shown in FIGS. 2 and 3, the reduction-drive device 23 has inside a housing 31 and a first and a second reduction mechanisms 33 and 35 as reduction mechanisms, as well as a rear differential 37a.

The housing 31 has a structure in which a main body portion 39 and a cover portion 41. The main body portion 39 and the cover portion 41 are fastened and joined at a plurality of portions by bolts 43 or the like. This housing 31 has an input portion side 45 and an output portion side 47.

On the input portion side 45, the electric motor 5 is disposed on its outer portion, and is fixed by being fastened at a plurality of portions by bolts 49 or the like. Inside the input portion side 45, a transmission shaft 51 is rotatably supported by bearings 53 and 55. An output shaft 57 of the electric motor 5 is interlocked and coupled to one end of the transmission shaft 51. One reduction gear 59 of the first reduction mechanism 33 is provided on the other end of the transmission shaft 51. The other reduction gear 61 of the first reduction mechanism 33 meshes with the reduction gear 59. The reduction gear 61 is provided on an intermediate transmission shaft 63 so as to rotate integrally therewith.

The intermediate transmission shaft 63 is rotatably supported on the housing 31 side by means of a bearing 65 and a needle bearing 67. One reduction gear 69 of the second reduction mechanism 35 is provided on the intermediate transmission shaft 63. The other reduction gear 72 of the second reduction mechanism 35 meshes with the reduction gear 69. The reduction gear 72 is formed on a reduction member 71.

The arrangement provided is such that the torque of the electric motor 5 is decelerated by the first and second reduction mechanisms 33 and 35. Thus, the reduction member 71 constitutes an output side of the reduction mechanism made up by the first and second reduction mechanisms 33 and 35.

The rear differential 37 distributes an output of the second reduction mechanism 35, transmitted through the clutch unit 200, to the axle shafts 25 and 27. The rear differential 37 has a differential case 75.

The differential case 75 is rotatably supported in the housing 31 by means of ball bearings 77 and 79. A pinion gear 83 is rotatably supported in the differential case 75 through a pinion shaft 81. Left and right side gears 85 and 87 are engaged and coupled to the pinion gear 83. The axle shafts 25 and 27 on the rear wheels 11 and 13 side are arranged to be interlocked with the side gears 85 and 87. The reduction gear 71 is supported relatively rotatably with respect to the differential case 75 by means of a ball bearing 89, so that the reduction member 71 is coaxially supported on the differential case 75.

A dog clutch 91 as one component of the clutch unit 200 is positioned between the reduction member 71 as an input shaft 71 of the clutch unit 200 and the differential case 75 as an output shaft 75 of the clutch unit 200. The dog clutch 91 is arranged to be engaged and disengaged. Thereby, when the dog clutch 91 is engaged, the output of the second reduction mechanism 35 is transmitted to the rear differential gear 37 through the input shaft 71 and output shaft 75, and when the dog clutch 91 is disengaged, the output of the second reduction mechanism 35 with respect to the rear differential 37 is cutoff.

A restricting means (a first moving mechanism) 93 is provided as the other component of the clutch unit 200. The restricting means (first moving mechanism) 93 restricts the engaging coupling of the dog clutch 91 until the revolution of the input shaft 71 and the revolution of the output shaft 75 correspond to each other so as to be suitable for the engaging coupling when the dog clutch 91 has been actuated to transmit the driving force of the input shaft 71 to the output shaft 45, after the starting of output rotation of the electric motor 5.

First, the dog clutch 91 is constituted of an input side teeth portion 95, an output side teeth portion 97, and a sleeve 99.

The input side teeth portion 95 is provided integrally with the input shaft 71 which is the output side of the second reduction mechanism 35. The output side teeth portion 97 is annularly provided integrally with the output shaft 75 (differential case 75) which is the input side of the rear differential 37. The sleeve 99 has a clutch engaging portion (sleeve side teeth portion) 101 on its inner peripheral surface. The clutch engaging portion (sleeve side teeth portion) 101 always meshes with the output side teeth portion 97. As the sleeve 99 moves in a direction along the axis of rotation, the sleeve 99 can be actuated into a state of engaging with only the output side teeth portion 97 and into a state of engaging with both the output side teeth portion and the input side teeth portion 97 and 95.

Figure 4:
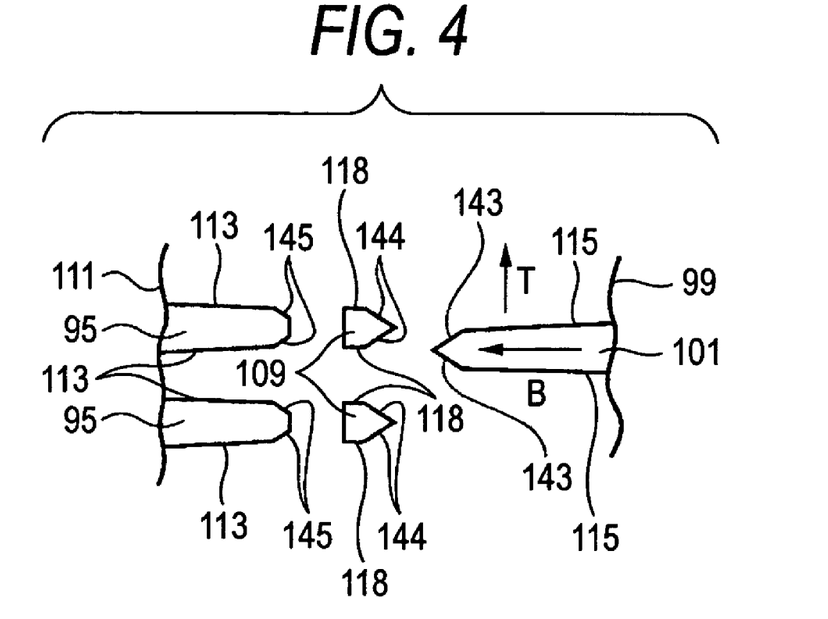
FIG. 4 is a development plan view of essential portions for explaining the operation of a first moving mechanism and a disengaging mechanism in accordance with the embodiment.

FIG. 4 is a development view illustrating the relationship between the sleeve side teeth portion 101, the idle teeth portion 109 and the input side teeth portion 95. As shown in FIG. 4, the sleeve side teeth portion 101, the idle teeth portion 109 and the input side teeth portion 95 are respectively provided with tooth end abutment surfaces 143, 144 and 145 at their tooth end portions.

Abutment surfaces 113 and 115 are formed on respective teeth of the input side teeth portion 95 and the sleeve side teeth portion 101 of the dog clutch 91. The abutment surfaces 113 and 115 are formed as positive tapers, in which each tooth of the input side teeth portion 95 has a thickness that continuously decreases toward the output shaft 75 side, and each tooth of the sleeve side teeth portion 101 has a thickness that continuously decreased toward the input shaft 71 side. Thereby, the abutment surfaces 113 and 115 generate an actuating force in a direction in which the dog clutch 91 becomes disengaged by the transmission of the torque. The abutment surfaces 113 and 115 constitute a disengaging mechanism for generating a thrust to move the dog clutch in a direction in which the dog clutch becomes disengaged.

The restricting means (first moving mechanism) 93 consists of an idle rotator 103 and conical surfaces 105 and 107. The idle rotator 103 is provided with an idle teeth portion (idle engage portion) 109. The idle teeth portion 109 is disposed between the input side teeth portion 95 and the output side teeth portion 97, and the sleeve side teeth portion 101 is capable of engaging therewith.

Further, the idle teeth portion 109 may include abutment surfaces 118 formed as positive tapers, wherein each tooth of the idle teeth portion 109 has a thickness that continuously decreases toward the input shaft 71 side.

The conical surfaces 105 and 107 are provided between the idle rotator 103 and the input shaft 71. The conical surface 105 is formed on an outer peripheral surface of a cylindrical portion 111 formed on one end portion of output shaft side 75 of the input shaft 71. The conical surface 107 is formed on an inner peripheral surface of the idle rotator 103. Thus, the idle rotator 103 is coaxially disposed on the cylindrical portion 111.

The dog clutch 91 is adapted to be actuated by an operation mechanism (clutch driving means) 117. The operation mechanism 117 is capable of actuating the dog clutch 91 into a state of engagement, and capable of restricting the dog clutch 91 to move in a direction to disengage in that state.

As for the operation mechanism 117, the changeover motor 24 is mounted on the main body portion 39 of the housing 31 by means of a bracket 119.

A gear portion 122 is provided on an output shaft 121 of the changeover motor 24. A gear portion 125 of a rotating ring 123 meshes with the gear portion 122. The rotating ring 123 consists of a reduction rotor (an outer ring) 127 having the gear portion 122 and an inner ring 129. A coil spring 131 constituting a delaying mechanism is provided between the reduction rotor 127 and the inner ring 129. One end of the coil spring 131 is attached to the reduction rotor 127, and the other end thereof is attached to the inner ring 129.

Accordingly, even when the reduction rotor 127 rotates, and the inner ring 129 is not interlocked, the coil spring 131 is deflected to impart an urging force to the inner ring 129. By virtue of this urging force, the inner ring 129 is capable of rotating by that urging force when the inner ring 129 is set in a rotatable state.

The operation mechanism 117 has a second moving mechanism for restricting, by means of a cam structure 133, the movement of the dog clutch 91 in the direction in which the dog clutch 91 becomes disengaged. The cam structure 133 generates a thrust to move the dog clutch 91 in a direction in which the dog clutch 91 becomes engaged.

A movable plate 137 faces the inner ring 129 of the rotating ring 123 with a needle bearing 135 disposed therebetween. The movable plate 137 is integrally formed with the sleeve 99. A return spring 141 is interposed between the movable plate 137 and a wall portion 139 of the differential case (output shaft) 75.

Figure 5:
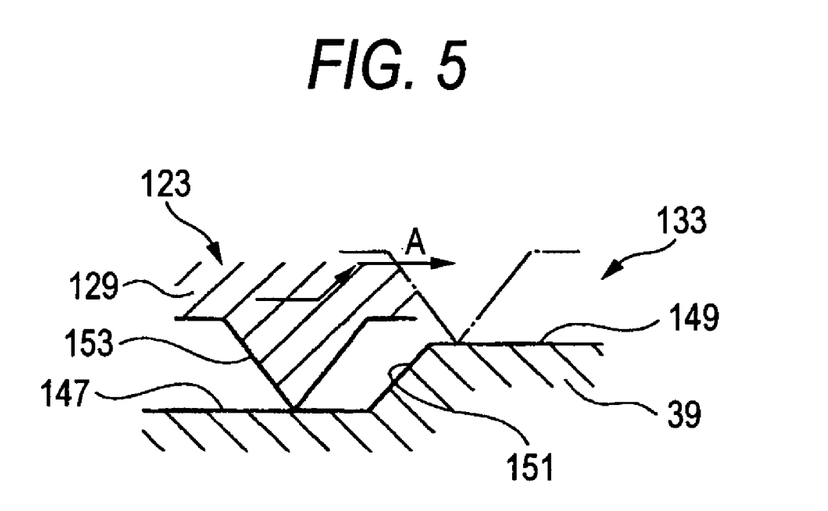
FIG. 5 is a development cross-sectional view of a cam structure in accordance with the embodiment.

FIG. 5 is a development cross-sectional view of the cam structure 133. The cam structure 133 is constituted of two-stage guide surfaces 147 and 149 formed continuously on the main body portion 39 side of the housing 31 through an inclined surface 151 and a projecting portion 153 formed on the inner ring 129 of the rotating ring 123. The projecting portion 153 is slidable and movable through the guide surface 147, inclined surface 151 and the guide surface 149.

Next, a description will be given of the operation.

As the electric motor 5 rotates, the torque is outputted from the output shaft 57 of the electric motor 5 to the transmission shaft 51. As a result of the output of this torque, the torque is transmitted to the intermediate transmission shaft 63 through the reduction gears 59 and 61 of the first reduction mechanism 33.

The torque is outputted from the intermediate transmission shaft 63 to the rear differential 37 side through the reduction gears 69 and 71 of the second reduction mechanism 35. When the dog clutch 91 is a state in which it is capable of transmitting the torque, i.e., when the sleeve 73 has moved in a direction along the axis of rotation and the sleeve side teeth portion 101 is engaged with the input side teeth portion 95, the torque is transmitted from the reduction gear 71 as the input shaft 71 of the clutch unit 200 to the differential case 75 as the output shaft 75 of the clutch unit 200 sequentially through the input side teeth portion 95, the sleeve 99, the sleeve side teeth portion 101, and the output side teeth portion 97.

The torque is transmitted from the output shaft 75 as the differential case 75 to the axle shafts 25 and 27 side through the pinion shaft 81, the pinion gear 83, and the side gears 85 and 87, thereby driving the rear wheels 11 and 13.

During the differential rotation of the rear wheels 11 and 13, the side gears 85 and 87 differentially rotate through the rotation of the pinion gear 83, thereby allowing the differential rotation of the rear wheels 11 and 13.

The engaging operation of the dog clutch 91 is effected by the driving of the changeover motor 24 under control by the controller 10. When the changeover motor 24 is driven, the gear portion 122 is rotatively driven through the output shaft 121. The torque is transmitted to the reduction rotor (outer ring) 127 of the rotating ring 123 through the gear portion 125 by the rotative driving of the gear portion 122. The rotating ring 123 is rotated by this torque, and the projecting portion 153 of the inner ring 129 moves from the guide surface 147 to the guide surface 149 side through the inclined surface 151 in the direction of arrow A in FIG. 5. Through this movement, the rotating ring 123 moves in the direction along the axis of rotation, and pushes the movable plate 137 through the needle bearing 135.

The movable plate 137 moves while deflecting the return spring 141, and the sleeve 99 is interlocked integrally with the movable plate 137. As a result of the movement of the sleeve 99, the sleeve side teeth portion 101 abuts against the idle teeth portion 109. When the output-side revolution of the second reduction mechanism 35 (that is the revolution of the input shaft 71 of the clutch unit 200) and the input-side revolution of the rear differential gear 37 (that is the revolution of the output shaft 75 of the clutch unit 200) correspond to each other so as to be suitable for engagement, i.e., when synchronization is established, the sleeve side teeth portion 101 is engaged with the idle teeth portion 109, and further, the sleeve side teeth portion 101 is engaged with the input side teeth portion 95. Through this engagement, the transmission of the torque can be effected, as described above.

In this state of engagement, as shown in FIG. 5, the projecting portion 153 has ridden on the guide surface 149. By this riding, the rotating ring 123 is restricted from being moved in the direction along the axis of rotation. Due to the presence of this restriction, even if the abutment surfaces 113 and 115 with positive tapers are formed on the input side teeth portion 95 and the sleeve side teeth portion 101, the engagement is not canceled during the transmission of the torque.

When the engaging clutch 91 is actuated into a torque cutoff state, the changeover motor 24 is driven in an opposite direction. Through this driving, the projecting portion 153 shown in FIG. 5 referred to earlier is moved from the guide surface 149 to the guide surface 147 side through the inclined surface 151 in a reverse operation to the one described above.

Accordingly, the positional restriction of the movable plate 137 is canceled, and the positional restriction of the sleeve 99 is also canceled. Upon this cancellation of the positional restriction, an actuating force is generated in a direction in which the input side teeth portion 95 becomes disengaged from the sleeve side teeth portion 101, by virtue of the function of the positive tapers of the abutment surfaces 113 and 115 of the sleeve side teeth portion 101 and input side teeth portion 95, as a result of the engagement between the input side teeth portion 95 and the sleeve side teeth portion 101 during the transmission of the torque. As a result of this actuating force and the urging force of the return spring 141, the sleeve 99 is smoothly moved, thereby positively allowing the sleeve 99 to be disengaged from the input side teeth portion 95.

In the above-described engaging operation, in a case where the revolution of the input shaft 71 (the output-side revolution of the second reduction mechanism 35) and the revolution of the output shaft 75 (the input-side revolution of the rear differential 37) are not synchronized and do not correspond to each other so as to be suitable for the engagement of the dog clutch 91, the engagement of the dog clutch 91 is restricted until the revolution of the input shaft 71 and the revolution of the output shaft 75 are synchronized.

Figure 6:
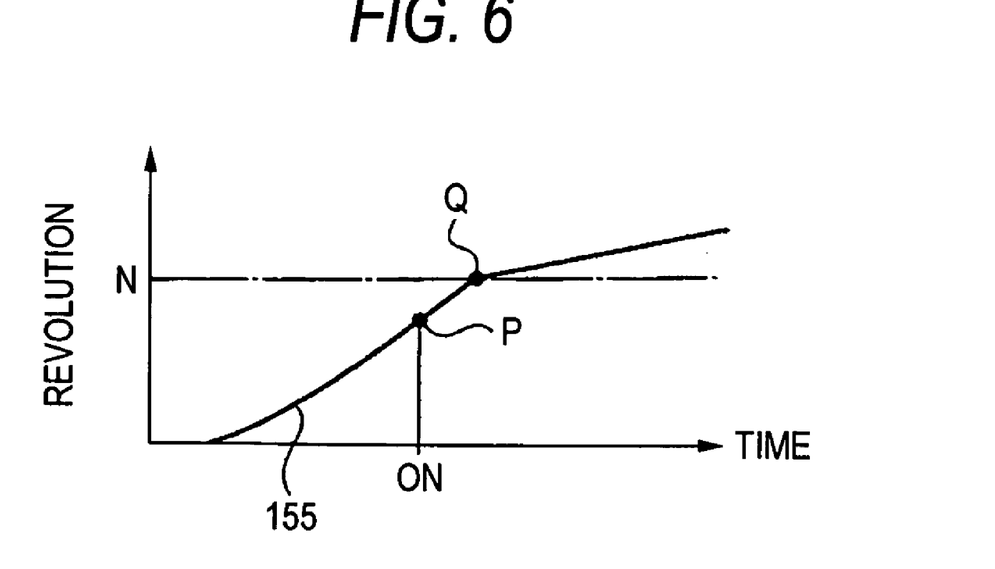
FIG. 6 is a graph illustrating the operation of an electric motor in accordance with the embodiment.

FIG. 6 is a graph illustrating the relationship between an increase in the revolution of the electric motor 5 and the revolutions of the axle shafts 25 and 27.

When the rear wheels 11 and 13 start to be driven by the output torque of the electric motor 5, the revolution of the electric motor 5 gradually rises under control by the controller 10, as indicated by a line segment 155 in FIG. 6. At a point of time of P when the revolution of this electric motor 5 has approached a value N, that is a product of a revolution RN of the axle shafts 25 and 27 multiplied by a reduction ratio RR of the reduction-drive device (N=RN×RR), an actuating signal is sent from the controller 10 to the changeover motor 24, and the changeover motor 24 is turned ON.

As the changeover motor 24 is turned ON, the sleeve 99 moves in the direction of arrow B in FIG. 4, and starts its engaging operation. At this time, the idle rotator 103 is interlocked with the input shaft 71 side through the conical surfaces 105 and 107. The tooth end abutment surfaces 143 of the sleeve side teeth portion 101 are engaged with the tooth side abutment surfaces 145 of the idle teeth portion 109 of this idle rotator 103.

When the sleeve side teeth portion 101 moves further in the direction of arrow B due to this engagement, a pressing force is imparted to the idle rotator 103 in the direction along the axis of rotation through the tooth end abutment surfaces 143 and 145. The conical surfaces 105 and 107 are pressed by this pressing force. At the conical surfaces 105 and 107, the frictionally engaging force is increased in correspondence with the pressing force. When the frictionally engaging force is increased, tooth end portions of the sleeve side teeth portion 101 receive torque based on the difference between the revolution of the input shaft and the revolution of the output shaft from tooth end portions of the idle teeth portion 109 through the tooth end abutment surfaces 143 and 145. By virtue of this torque, resistance force with respect to the sleeve 99 in the direction of movement for engagement increases, and it is possible to positively restrict the motion of the sleeve 99 into the state of engagement with both the input and output engaging portions 97 and 95.

When the revolution of the electric motor 5 reaches a point Q in FIG. 6, the input side teeth portion 95 is synchronized with the sleeve side teeth portion 101. Therefore, the resistance force with respect to the sleeve 99 in the direction of movement for engagement through the tooth end abutment surfaces 143 and 145 in FIG. 4 practically disappears. Hence, the sleeve side teeth portion 101 moves in the direction along the axis of rotation so as to mesh with the idle teeth portion 109.

Through this movement, the sleeve side teeth portion 101 is capable of smoothly meshing with the input side teeth portion 95 in the synchronized state. The structural relationship between the tooth end portions of the sleeve side teeth portion 101 and the input side teeth portion 95 is shown in FIG. 4 to allow smooth engagement.

When the sleeve side teeth portion 101 abuts against the idle teeth portion 109 at their tooth end abutment surfaces 143 and 145 and their engagement is restricted, the sleeve 99 is unable to move in the direction along the axis of rotation. For this reason, the coil spring 131 is deflected, and the inner ring 129 is urged relative to the outer ring (reduction rotor) 127 of the rotating ring 123. At this time, since the load of the changeover motor 24 increases, the controller 10 determines that the sleeve side teeth portion 101 is not engaged with the input side teeth portion 95, and the controller 10 is capable of informing the driver to that effect by giving a predetermined display, such as by lighting up a warning lamp, or by issuing a buzzer sound. Such a detection can also be effected by detecting the moving operation for engagement of the sleeve 99 and the like by a position sensor.

When the sleeve 99 is set in a movable state through the above-described synchronization, the inner ring 129 of the rotating ring 123 rotates relative to the outer ring (reduction rotor) 127 by the urging force of the coil spring 131. Hence, the sleeve 99 moves so as to mesh with the input side teeth portion 95 in the above-described manner.

Figure 7:
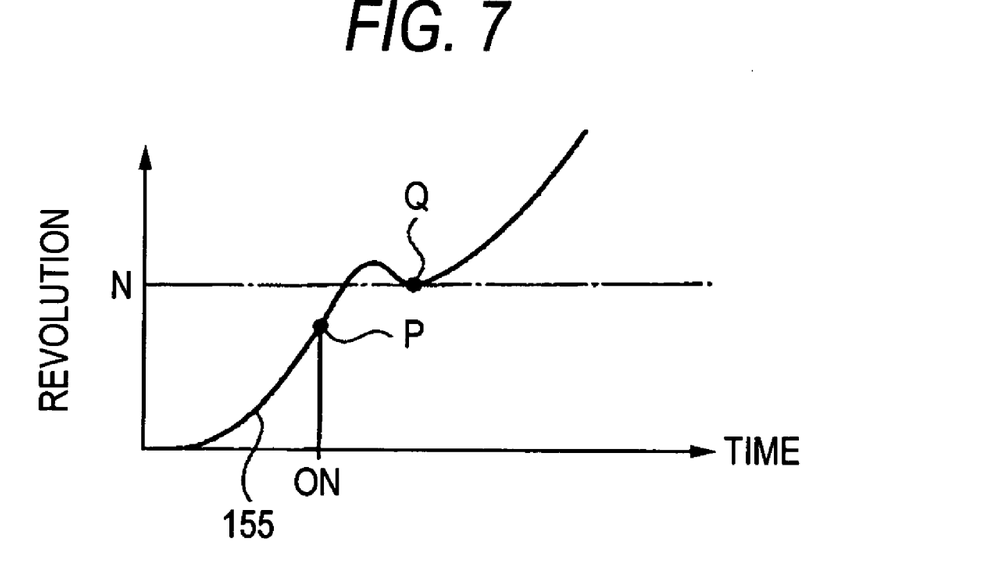
FIG. 7 is a graph illustrating the operation of the electric motor in a case where an engagement has failed at the time of synchronization.

FIG. 7 is a graph illustrating control operation in a case where the engaging coupling of the dog clutch 91 has failed in the state of synchronization between the revolution of the input shaft 71 and the revolution of the output shaft 75.

As shown in FIG. 7, in a case where the changeover motor 24 is operated at the point P, and even if the revolution of the input shaft 71 and the revolution of the output shaft 75 are synchronized to correspond to N, if the dog clutch 99 does not undergo engaging coupling due to some factor, the following control is carried out.

In the case where the engaging coupling has failed as described above, the revolution of the input shaft 71, due to the rotation of the electric motor 5 through the second reduction mechanism 35, exceeds the revolution of the output shaft 75 due to the rotation of the axle shafts 25 and 27 through the rear differential 37. At this time, an increase of the load due to the coil spring 131 is loaded to the changeover motor 24, as described above. Under the conditions of this increased load and the revolution of the electric motor 5 being in excess of the corresponding value of revolution for the rear wheels 11 and 13 side, the controller 10 determines that the engagement of the dog clutch 91 has failed, and decreases the revolution of the electric motor 5. Through this control of revolution, the engagement of the dog clutch 91 is effected again at the synchronization position of the point Q.

Accordingly, even in cases where the engaging coupling of the dog clutch 91 has failed for some reason or other, the electric motor 5 does not undergo high rotation to no purpose, and it is possible to maintain the durability of the electric motor 5.

Further, the controller 10 may carry out a control of the clutch unit 200 as follows. In a first step, the controller 10 determines whether or not a difference between the revolution of the input shaft 71 and the revolution of the output shaft 75 is in a range suitable for the engagement of the dog clutch 91. If the controller 10 determines that the difference is over the range suitable for the engagement, the controller 10 controls the electric motor 5 to decrease the revolution, in a second step. If the controller 10 determines that the difference is in the range suitable for the engagement, the controller 10 controls the changeover motor 24 in order to move the sleeve 99 and the engagement of the dog clutch 91 is performed, in the third step. The revolution of the input shaft 71 can be calculated from a detected value of an output-rotation sensor 201 arranged on the output shaft 57 of the electric motor 5. However, revolution of the input shaft 71 can be calculated from a detected value of a rotation sensor 202 arranged on one of transmission shafts 51 and 63, and can be directly detected by a rotation sensor 203 directly arranged on the input shaft 71. Further, the revolution of the output shaft 75 can be calculated from a detected value of rear wheel speed sensors 206 and 207. However, the revolution of the output shaft 75 can be calculated from a detected value of the rotation sensors 208, 209 arranged on the axle shafts 25 and 27, and can be directly detected by a rotation sensor 210 directly arranged on the output shaft 75.

As described above, the engagement of the dog clutch 91 can be restricted until the revolution of the input shaft 71 and the revolution of the output shaft 75 correspond to each other so as to be suitable for the engagement, and the engagement can be effected when the revolution of the input shaft 71 and the revolution of the output shaft have corresponded so as to be suitable for the engagement. Accordingly, any engagement shocks of the dog clutch 91 can be accurately suppressed.

In addition, since the dog clutch 91 is used, it is possible to substantially improve the torque transmitting capacity, despite the fact that the dog clutch is compact as compared with the multiple-disk friction clutch.

When the dog clutch 91 is disengaged from coupling and is set in the torque cutoff state, drag torque as in the case of the multiple-disk friction clutch do not occur, and it is possible to effect a positive cut off. By virtue of this positive cutoff, when the front wheels rotate in a leading manner with respect to the driving source, the driving source is prevented from being forcibly rotated by the drag torque. Thus, it is possible to reliably protect the driving source and the like, and improvement in fuel consumption is also possible.

While it is possible to positively maintain the engaged state in the state in which the dog clutch 91 is engaged, when the dog clutch 91 has been actuated to be shifted into the torque cutoff state by the operation mechanism 117, it is possible to actuate the dog clutch 91 positively in a direction in which it is disengaged by the actuating force of the abutment surfaces 113 and 115.

Accordingly, it is possible to effect more accurately the positive maintenance of the engaged state of the dog clutch 91 and the shifting operation to the torque cutoff state.

It should be noted that an insert, a spread spring, and a hub may be provided on the inner peripheral side of the sleeve 99, and the insert urged by the spread spring may be engaged with the idle rotator 103 in the rotating direction. The arrangement provided is such that when the sleeve 99 is actuated, the idle rotator 103 is pressed by the insert in the direction along the axis of rotation, to thereby cause the conical surfaces 105 and 107 to abut. Additionally, it is also possible to provide an arrangement in which when synchronization is established, the sleeve 99 effects the engaging operation while pressing down the insert.

The reduction-drive device including the clutch unit of the invention can also be disposed on the front wheel side. Further, the clutch unit is applicable not only to a four-wheel drive vehicle but also to other apparatuses.

As for the above-described operation mechanism of the clutch unit, the structure for restricting the movement of the dog clutch 91 in the direction in which it becomes disengaged is not limited to the above-described cam structure 133, and can be provided by another structure using a link, a lever, or the like.

What is claimed is:

1. A clutch unit, comprising:
   a first shaft comprising a first teeth portion formed on an outer circumference of the first shaft;
   a second shaft comprising a second teeth portion formed on an outer circumference of the second shaft; and
   a sleeve comprising a sleeve side teeth portion formed on an inner circumference of the sleeve, wherein the sleeve is movable between a position where the sleeve side teeth portion meshes with only the second teeth portion and a position where the sleeve side teeth portion meshes with both the first teeth portion and the second teeth portion,
   wherein each tooth of the first teeth portion has a thickness that continuously decreases toward a second shaft side, and
   wherein each tooth of the sleeve side teeth portion has a thickness that continuously decreases toward a first shaft side.

2. The clutch unit according to claim 1, wherein the first shaft is an input shaft, and the second shaft is an output shaft, the clutch unit further comprising:
   an operation mechanism for operating the sleeve; and
   a first moving mechanism for restricting a movement of the sleeve in a direction in which the sleeve and the input shaft become engaged, until a revolution of the input shaft and a revolution of the output shaft becomes suitable for an engagement.

3. The clutch unit according to claim 2, wherein the first moving mechanism comprises an idle rotator having a ring-like shape and provided on the input shaft.

4. The clutch unit according to claim 3, wherein the first moving mechanism further comprises conical surfaces provided between the idle rotator and the input shaft.

5. The clutch unit according to claim 3, wherein the first teeth portion is an input side teeth portion integrally rotatable with the input shaft,
   the second teeth portion is an output side teeth portion integrally rotatable with the output shaft, and
   the idle rotator comprises an idle teeth portion disposed between the input side teeth portion and the output side teeth portion, and is meshable with the sleeve side teeth portion.

6. The clutch unit according to claim 5, wherein the operation mechanism comprises a second moving mechanism for restricting a movement of the sleeve in a direction in which the sleeve and the input shaft become disengaged.

7. The clutch unit according to claim 6, wherein the second moving mechanism comprises a cam structure for generating a thrust to move the sleeve in the direction in which the sleeve and the input shaft become engaged.

8. The clutch unit according to claim 7, wherein the operation mechanism further comprises an actuator and a reduction rotor.

9. The clutch unit according to claim 8, wherein the operation mechanism further comprises a spring disposed between the reduction rotor and the cam structure.

10. The clutch unit according to claim 2, further comprising abutment surfaces formed on respective teeth of the input side teeth portion and the sleeve side teeth portion, wherein the abutment surfaces comprise a disengaging mechanism for generating a thrust to move the sleeve in a direction in which the sleeve and the input shaft become disengaged.

11. The clutch unit according to claim 2, wherein the clutch unit is applied to a vehicle including:
    a first driving source and a second driving source, wherein the input shaft of the clutch unit is connected to the second driving source, and the output shaft of the clutch unit is able to be driven based on a driving force from the first driving source.

12. The clutch unit according to claim 11, wherein one of the first and the second driving sources is a main driving source, and the other is an auxiliary driving source.

13. The clutch unit according to claim 12, wherein the main driving source comprises an internal combustion engine, and the auxiliary driving source comprises an electric motor, and one of the internal combustion engine and the electric motor drives one of front and rear wheels, and the other one of the internal combustion engine and the electric motor drives the other one of front and rear wheels.

14. A clutch unit, comprising:
    an input shaft;
    an output shaft;
    a dog clutch engagable and disengagable to connect and disconnect the input shaft and the output shaft;
    an operation mechanism for operating the dog clutch; and
    a first moving mechanism for restricting a movement of the dog clutch in a direction in which the dog clutch becomes engaged until a revolution of the input shaft and a revolution of the output shaft become suitable for an engagement of the dog clutch,
    wherein the clutch unit is applied to a vehicle comprising a first driving source and a second driving source,
    wherein the input shaft of the clutch unit is connected to the second driving source,
    wherein the clutch unit further comprises a controller that controls the operation mechanism to operate the dog clutch to engage when a difference between a revolution of the input shaft and the revolution of the output shaft is in a range, and controls the second driving source so as to change the revolution of the second driving source when the difference is over the range,
    wherein the second driving source is an electric motor, wherein the first driving source drives one of the front and the rear wheels, and the second source drives the other of the front and rear wheels, wherein the output shaft is connected to an axle of the other of the front and rear wheels, and wherein the controller controls the second driving source based on a revolution of the output shaft when the difference is over the range.

15. The clutch unit according to claim 14, further comprising an input shaft side sensor for detecting the revolution of the input shaft, and an output shaft side sensor for detecting the revolution of the output shaft.

16. The clutch unit according to claim 14, wherein the revolution of the input shaft is calculated from a detected value of one of an output-rotational sensor on an output shaft of the electric motor, a rotation sensor on a transmission shaft between the electric motor and the clutch unit, and a rotation sensor directly arranged on the input shaft, and wherein the revolution of the output shaft is calculated from a detected value of one of a rear wheel sensor, a rotation sensor on an axle shaft, and a rotation sensor directly arranged on the output shaft.

* * * * *